(12) United States Patent
Forsman et al.

(10) Patent No.: US 10,172,034 B2
(45) Date of Patent: Jan. 1, 2019

(54) ADJUSTING RAN CAPABILITY BASED ON DATA TRANSPORT CHARACTERISTICS OF A BACKHAUL NETWORK IN A TELECOMMUNICATION NETWORK

(71) Applicant: TELEFONAKTIEBOLAGET L M ERICSSON (PUBL), Stockholm (SE)

(72) Inventors: Mats Forsman, Rönninge (SE); Erik Friman, Stockholm (SE); Tomas Thyni, Järfälla (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 239 days.

(21) Appl. No.: 15/025,505

(22) PCT Filed: Oct. 1, 2013

(86) PCT No.: PCT/SE2013/051138
§ 371 (c)(1),
(2) Date: Mar. 28, 2016

(87) PCT Pub. No.: WO2015/050481
PCT Pub. Date: Apr. 9, 2015

(65) Prior Publication Data
US 2016/0242068 A1  Aug. 18, 2016

(51) Int. Cl.
*H04W 24/02* (2009.01)
*H04W 28/02* (2009.01)
(Continued)

(52) U.S. Cl.
CPC ....... *H04W 28/0289* (2013.01); *H04W 24/08* (2013.01); *H04W 28/0247* (2013.01);
(Continued)

(58) Field of Classification Search
CPC ...... H04W 24/02; H04W 16/10; H04W 24/08
See application file for complete search history.

(56) References Cited

U.S. PATENT DOCUMENTS 8,170,544 B1  5/2012  Satapathy et al.
8,363,564 B1  1/2013  Talley et al.
(Continued)

FOREIGN PATENT DOCUMENTS

GB  2454872 A   5/2009
WO  2011094644 A1  8/2011
(Continued)

*Primary Examiner* — Hassan A Phillips
*Assistant Examiner* — Prenell P Jones
(74) *Attorney, Agent, or Firm* — Sage Patent Group

(57) ABSTRACT

Method and communication network node for enabling a radio base station to adjust a Radio Access Network, RAN, capability within a RAN, such as handover or scheduling, dependent on a data transport characteristics of a backhaul network, such as data transfer rate, network delay and bandwidth. The RAN and the backhaul network are parts of a telecommunication network, and the first communication network node is arranged in the telecommunication network to communicate data between the RAN and a core network node in the telecommunication network.

By acquiring knowledge of variations of transport characteristics in backhaul networks, RAN capabilities may be adjusted, e.g. by performing handover of UEs to other radio base stations which have better backhaul transport characteristics. Thereby, user experience for the users of the UE may be increased. In addition, an operator of the communication network may make better use of installed transport capacity.

16 Claims, 5 Drawing Sheets

(51) Int. Cl.
  *H04W 24/08*  (2009.01)
  *H04W 36/16*  (2009.01)
  *H04W 36/00*  (2009.01)
  *H04W 36/22*  (2009.01)

(52) U.S. Cl.
  CPC ...... *H04W 36/165* (2013.01); *H04W 36/0083* (2013.01); *H04W 36/22* (2013.01)

(56) References Cited

U.S. PATENT DOCUMENTS

| | | | |
|---|---|---|---|
| 8,886,209 B2* | 11/2014 | Shaw | H04W 36/22 370/331 |
| 2007/0177510 A1 | 8/2007 | Natarajan et al. | |
| 2012/0202498 A1 | 8/2012 | Sachs et al. | |
| 2013/0070742 A1 | 3/2013 | Picker et al. | |
| 2015/0103769 A1* | 4/2015 | Kaichis | H04W 16/04 370/329 |
| 2015/0257024 A1* | 9/2015 | Baid | H04W 24/10 370/338 |

FOREIGN PATENT DOCUMENTS

| | | |
|---|---|---|
| WO | 2012059131 A1 | 5/2012 |
| WO | 2013113405 A1 | 8/2013 |
| WO | 2014065725 A1 | 5/2014 |
| WO | 2015050482 A1 | 4/2015 |

* cited by examiner

ADJUSTING RAN CAPABILITY BASED ON DATA TRANSPORT CHARACTERISTICS OF A BACKHAUL NETWORK IN A TELECOMMUNICATION NETWORK

This application is a 371 of International Application No. PCT/EP2013/051138, filed Oct. 1, 2013, the disclosure of which is fully incorporated herein by reference.

TECHNICAL FIELD

The present disclosure relates to adaption of radio capabilities in wireless communication networks, especially it relates to adaption of radio capabilities of Radio Access Networks in dependence of data transport characteristics of backhaul networks.

BACKGROUND

Modern telecommunication networks are commonly divided in separate parts, which are defined as RAN (Radio Access Network), core network, and backhaul network. The RAN serves UEs (User Equipments) and provides users of the UEs with communication capabilities, by providing DL data from radio base stations to the UEs and UL data from the UEs to the radio base stations. The mobile core network is a central part of the telecommunication network and provides various services to the users who are connected by the RAN, e.g. telephony and data communication. The backhaul network is the intermediate connecting network, which connects the RAN to the mobile core network.

In this description, the term "User Equipment" will be used to denote any suitable communication terminal adapted to communicate with a radio base station. A UE may be implemented as a mobile phone, a PDA (Personal Digital Assistant), a handheld computer, a laptop computer, etc. A "radio base station" may be implanted as a NodeB, an eNodeB, a repeater, etc.

With reference to FIG. 1, which is a schematic block diagram, a communication scenario will now be described according to the prior art.

A telecommunication network is illustrated in the figure and comprises a RAN where an RBS (Radio base station) 120 is present, a backhaul network where an RNC (Radio Network Controller) 100 and a core network node 140 are present, and a core network. The communication network nodes, i.e. the RBS 120, the RNC 100 and the core network node 140 are connected to each other by communication links L.

Typically, the RBS 120 comprises conventional functionality (illustrated with a box "RBS") for downloading DL data to UEs and uploading UL data from the UEs, antennas (not shown), etc. The RNC 100 comprises conventional functionality (illustrated with a box "RNC") for exchanging DL and UL data between a plurality of RBSs 120 and the core network node 140. The core network node 140 comprises ordinary functionality (illustrated with a box "Core") for distributing the DL and UL data between the RNC 100 and the core network.

Traditionally, the RANs have been bottlenecks in the telecommunication networks, due to limited communication capabilities of the radio interface to the UEs. For instance, in communication systems using GSM (Groupe Special Mobile) or earlier RAN generations, the backhaul networks are often capable of providing services at higher data rates than the RANs are capable to deliver.

However, with the emergence of services, new RAN technologies have been introduced which are capable of serving the UEs with increased data rates. For instance, UMTS (Universal Mobile Telecommunication System), LTE (Long Term Evolution) and LTE Advanced systems have been defined by the 3GPP (Third Generation Partnership Project), and enables UL/DL data to be exchanged at increased data rates.

Today, the backhaul networks will not always be capable of delivering the desired data rates for communication of DL/UL data. For instance, this will be the case when backhaul links are affected by various disturbances, or when the installed backhaul capability is restricted due to aggregation of data traffic. When the users of the UEs performs services and the backhaul network is not capable of delivering the required data transfer rate, the users experience of the services may be that they are slow and/or time lagging, which may be perceived as annoying by the users.

To upgrade the communication links in the backhaul networks, for instance by installing fibre optic cables as communication links, requires a reasonable amount of resources and is time consuming and expensive.

Thus, there is a problem to devise a method for increasing user experience in telecommunication networks with restricted backhaul network characteristics.

SUMMARY

It would be desirable to obtain improved user experience in telecommunication networks. It is an object of this disclosure to address at least any of the issues outlined above. Further, it is an object to provide a mechanism for adaption of RAN (Radio Access Network) capabilities in response to variations in transport characteristics of backhaul networks. These objects may be met by a method and an arrangement according to the attached independent claims.

According to one aspect, a method performed by a first communication network node is provided for enabling a radio base station to adjust a Radio Access Network, RAN, capability within a RAN, such as handover or scheduling, dependent on a data transport characteristics of a backhaul network, such as data transfer rate, network delay and bandwidth. The RAN and the backhaul network are parts of a telecommunication network, and the first communication network node is arranged in the telecommunication network to communicate data between the RAN and a core network node in the telecommunication network. The method comprises to obtain, by a RAN Adaptation Selection unit of the first communication network node, information related to the data transport characteristics of the backhaul network. Furthermore, the method comprises to select by the RAN Adaptation Selection unit that the RAN capability will be adjusted, depending on the obtained information, and when it is selected the RAN capability will be adjusted, request a RAN Adaptation unit to adjust the RAN capability, the RAN Adaptation unit being comprised in a Radio Base Station serving the RAN.

By acquiring knowledge of variations of transport characteristics in backhaul networks, RAN capabilities may be adjusted, e.g. by performing handover of UEs to other radio base stations which have better backhaul transport characteristics. Thereby, user experience for the users of the UE may be increased. In addition, an operator of the communication network may make better use of installed transport capacity.

The method may be performed in a radio network controller, which obtains the information as a compiled backhaul characteristics value of at least one of: End-to-end measurements between the radio base station and the core network node, and link characteristics reports for communication links of the backhaul network, and wherein the compiled backhaul characteristics value is used as a basis when selecting that the RAN capability will be adjusted.

The disclosed method may alternatively be performed in a radio base station, which may be adapted to decide or select to adjust its RAN capabilities, in dependence to obtained information of variations in backhaul transport characteristics. By compiling results from a plurality of measurements into a backhaul characteristics value, as well current variations of backhaul characteristics and trends of variations may into account when deciding or selecting to adjust RAN capabilities. Furthermore, operator policies and RAN reports may in addition be taken into account, which may achieve a further more flexible use of installed transport capacity.

It is to be noted that according to another aspect, a corresponding communication network node which is adapted to perform the described method is also applicable.

BRIEF DESCRIPTION OF DRAWINGS

The solution will now be described in more detail by means of exemplary embodiments and with reference to the accompanying drawings, in which.

DETAILED DESCRIPTION

In telecommunication networks where RBSs (Radio Base Stations) are arranged to exchange data between RANs (Radio Access Networks) and a backhaul network, transport characteristics of the backhaul network may be restricted, even if the RANs are capable of serving a large quantity of UEs (User Equipment).

Today, RAN transport capabilities are determined, but backhaul characteristics is not taken into account when managing UEs in the RANs, e.g. for handling handover, or scheduling. For instance, an RBS which has good RAN characteristics may serve more UEs than the backhaul network is capable to. The user's QoE (Quality of Experience will then not be satisfying.

According to the proposed solution, communication network nodes will obtain information of backhaul characteristics, by performing various measurements of variations of backhaul characteristics, such as network delay, etc. With the proposed solution, RBSs which have restricted backhaul characteristics will be enabled to handover some UEs to less loaded RBSs, or influence its scheduling. By adjusting RAN capabilities in response to variations of backhaul capacities, the total load of the RBSs could be fairer, which give rise to a better QoE for the End-users.

Figure 1:
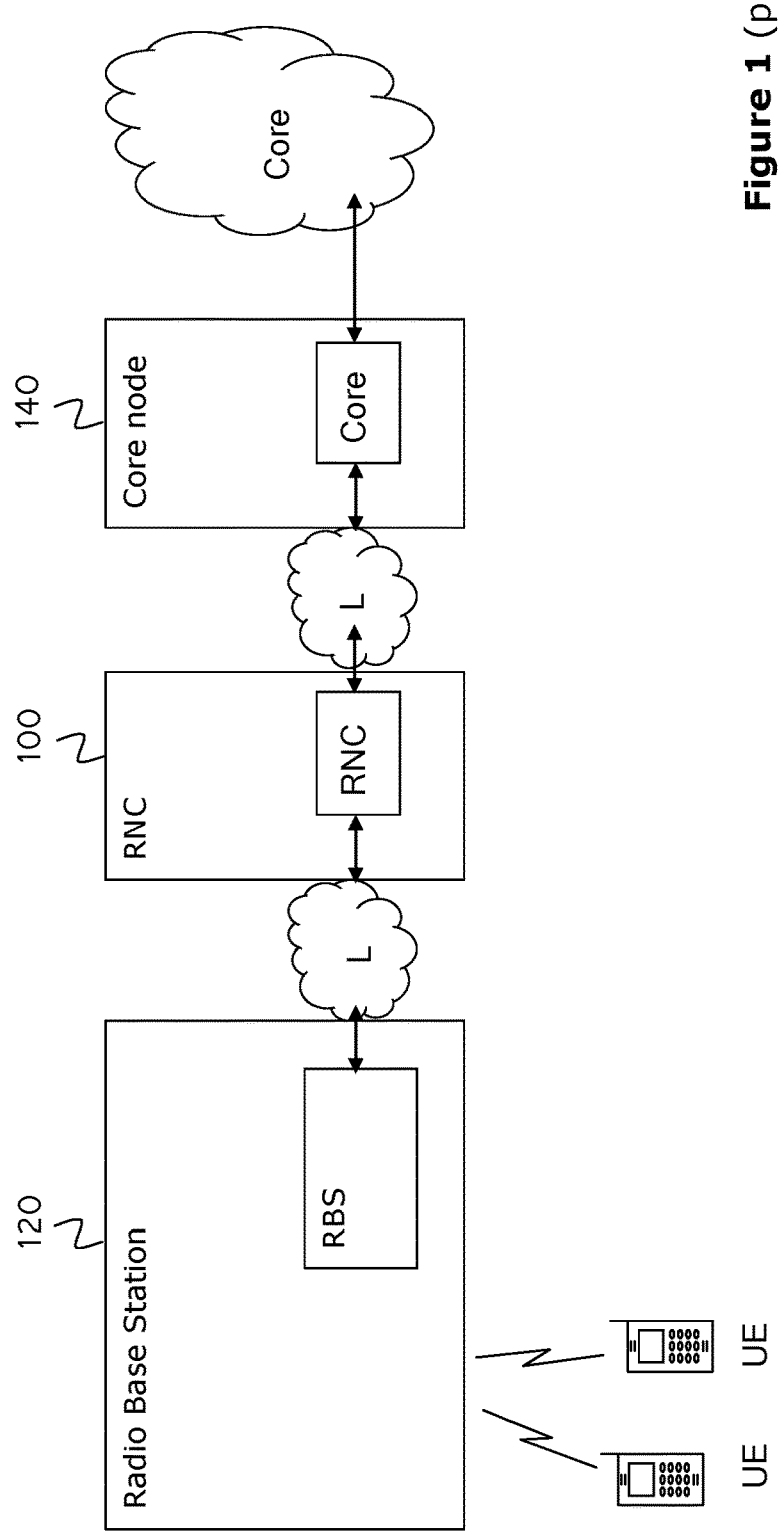
FIG. 1 is a schematic illustration of an arrangement in accordance with the prior art.
Figure 2:
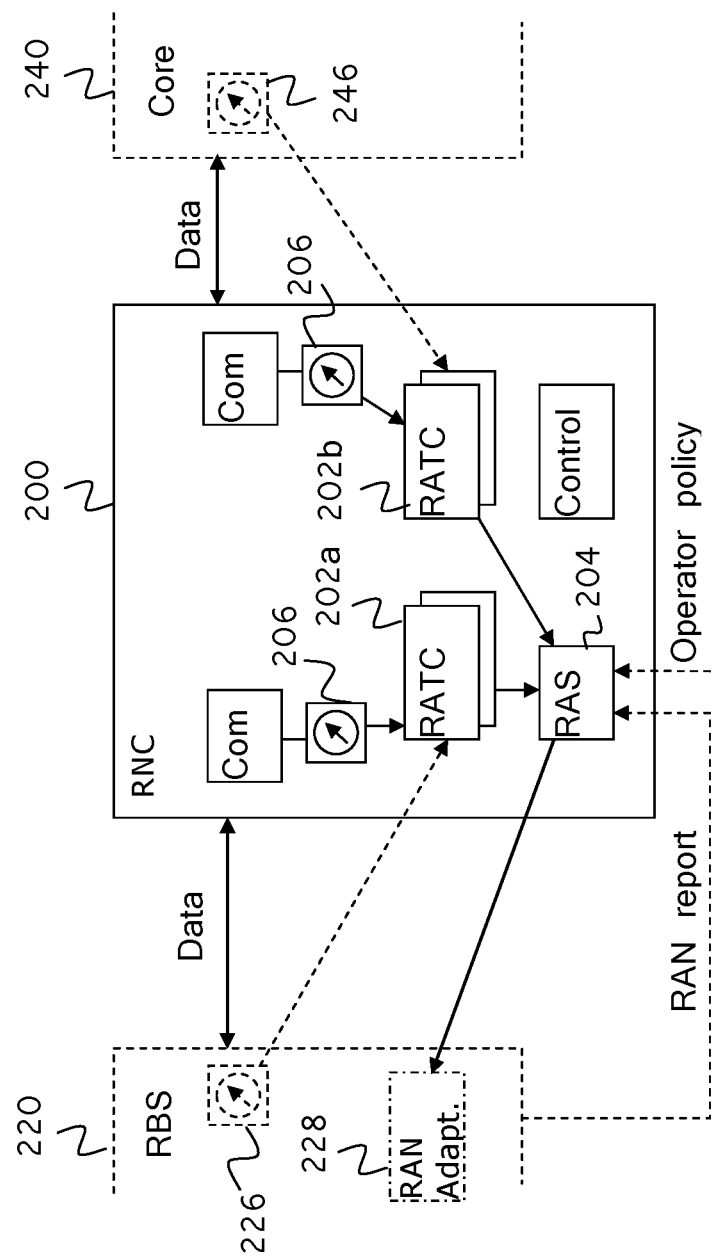
FIG. 2 is a schematic illustration of an arrangement, according to a possible embodiment.

With reference to FIG. 2, which is a schematic block diagram, a communication network node 200 will now be described in accordance with one exemplifying embodiment.

The communication network node 200 is implemented as an RNC (Radio Network Controller) in this embodiment. The RNC 200 is arranged in a backhaul network of a telecommunication network, where it is arranged to serve at least one radio base station 220, and exchange UL (uplink) data and DL (downlink) data, between the RBSs (Radio Base Station) and a core network node 240. The RNC 200 comprises RATC (RAN (Radio Access Network) Aggregation Transport Characteristics) units 202a, 202b, which are adapted to receive measurement results of transport characteristics of the backhaul network from reporting units 206, 226, 246, and compile the measurement results into a backhaul characteristics value. The backhaul characteristics value may be implemented as a numerical value, representing an overall status of the backhaul transport characteristics, e.g. in a scale "1-10", where "10" indicates full capacity and "1" severely restricted backhaul transport characteristics, or values reporting summarized backhaul characteristics like used and available bandwidth, delay, jitter etc. for a specific RBS.

In this embodiment, the reporting units 226, 246 are arranged to perform an End-to-End measurement of variations in delay for transmitted data in the backhaul network, according to TWAMP (Two-way Active Measurement Protocol). Other reporting units 206 are instead adapted to perform other measurements of variations for network delays and transport capacities, e.g. according to BART (Bandwidth Available in Real-Time), Transport timing interval for real-time service packets, ECN (Explicit Congestion Notification), CONEX (Partial Congestion Exposure), etc.

A RAS (RAN (Radio Access Network) Adaption Selection) unit 204 is arranged in the RNC 200 and is adapted to decide or select that the RAN capabilities will be adjusted, depending on the obtained information, i.e. variations of backhaul transport characteristics. The RAS 204 sends a request to an RBS to adjust its RAN capabilities, depending on the backhaul characteristics value. For instance, such a request may indicate that the RBS will handover a number of UEs (User Equipments) to another RBS, or that scheduling will be adjusted for some UEs. Typically, the request is sent via a communication interface (not shown) between the RNC 200 and the RBS 220. In the RBS 220, a RAN adaptation unit 228 may be arranged to receive the request and handle the adjustment to be performed. Such a RAN Adaptation unit 228 will be further described below in another embodiment. Correspondingly, similar appropriate communication interfaces may be implemented in the RAN 200 to receive the measurement results from the reporting units 226, 246 of the RBS 220 and core network node 240, respectively.

In an alternative exemplifying embodiment, which is based on the above described embodiment, further parameters may be applied by the RAS 204, when deciding or selecting that the RAN capabilities will be adjusted, e.g. pre-set operator policies by network operators, or RAN reports received from the RBS via the communication interface.

The RNC 200 comprises further conventional functionality arranged in order to operate the RNC 200 properly, e.g. controllers, communication interfaces, various memories, etc. However, any functionality which is not necessary for the understanding of the proposed solution will not be further discussed in this embodiment.

By obtaining information from a plurality of measurements of parameters representing backhaul characteristics, various variations of the transport characteristics of the backhaul network may be taken into account for forming an overall estimation of the backhaul characteristics. For instance, as well fast variations of delays and data rates and ongoing trends will together form a reliable estimation.

Even if the communication network node 200 of the described embodiments is implemented as an RNC and the communication network is a HSPA (High speed packet access) network in this exemplary embodiment, the present solution is not limited thereto. The communication network node 200 may, alternatively, be implemented as any suitable communication network node in a suitable communication network. For instance, the communication network node may be implemented as an eNodeB (evolved Node B) in an LTE (Long Term Evolution) communication network, or a suitable communication network node in a suitable radio access technology, e.g. WiFi (Wireless Fidelity), GSM (Groupe Special Mobile), CDMA (Code Division Multiple Access), SC-TDMA (Synchronous Code Time Divided Multiple Access), WiMax (Worldwide Interoperability for Microwave Access).

Figure 3:
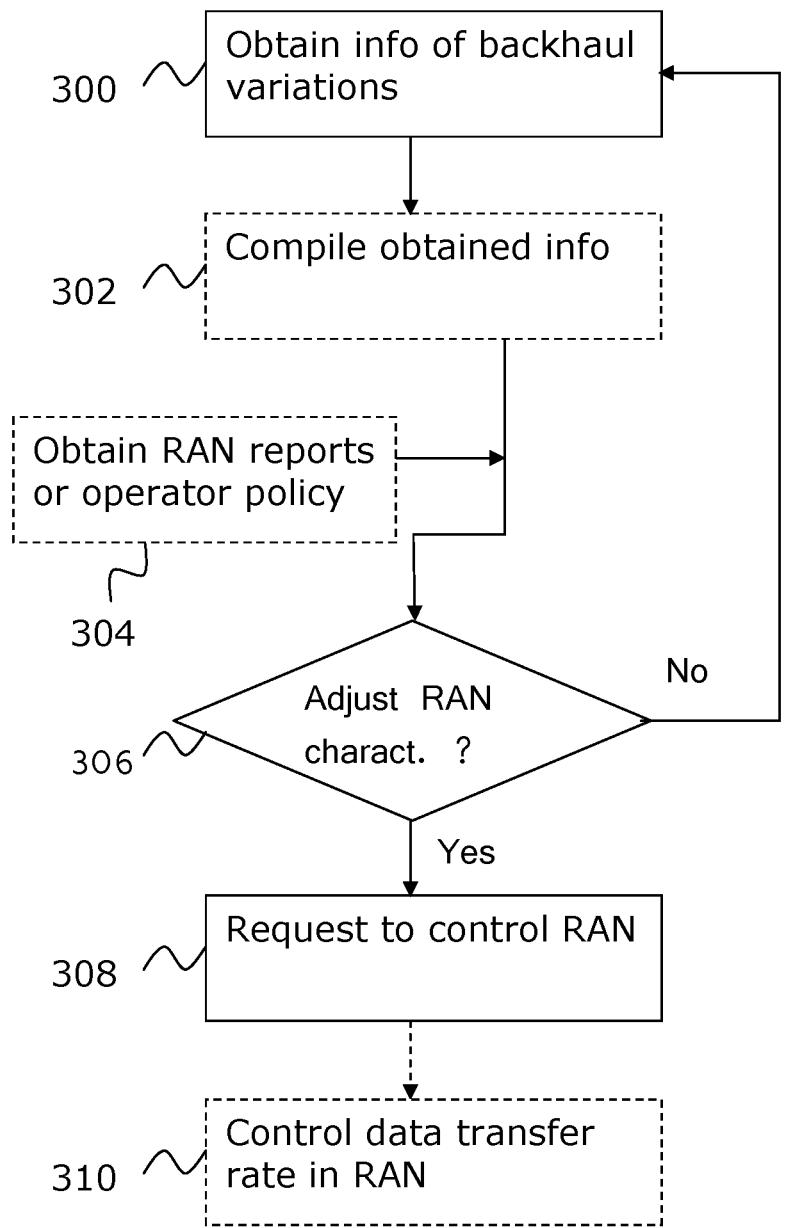
FIG. 3 is a schematic illustration of a method, according to possible embodiments.

With reference to FIG. 3, which is a schematic flow chart, a method in a communication network node will now be described in accordance with one exemplifying embodiment.

The communication network node is an RNC (Radio Network Controller) which is arranged in a backhaul network of a telecommunication network, where it is arranged to serve RBSs (Radio Base Stations), and exchange UL (uplink) data and DL (downlink) data, between the RBSs and a core network node.

In a first action 300, the RNC obtains information related to transport characteristics of the backhaul network. In this embodiment, the information is obtained as a backhaul characteristics value from another communication network node, e.g. the core network node or the RBS, which has compiled results from measurement of various backhaul transport characteristics into the backhaul characteristics value.

In a subsequent action 306, the RNC decides or selects whether RAN capabilities of RBSs will be adjusted, depending on the backhaul characteristics value. In this embodiment the backhaul characteristics value is compared with a pre-set value and depending on if the backhaul characteristics value is below or above the pre-set value, the RNC selects to either request the RBS to adjust its RAN capabilities, in a following action 308, or proceed to obtain information according to the action 300.

The RBS will then, in a following action 310, adjust its RAN capabilities in upon reception of the request. The action 310 (dashed line) is performed by the RBS and not the RNC, but in order to enable the understanding of the solution it is shown in the figure.

In an alternative exemplifying embodiment which is based on the embodiment described above, the information of backhaul variations is instead obtained as various measurement results of backhaul characteristics, in the action 300. Then the RNC compiles the obtained measurement results into a backhaul characteristics value, in an intermediate action 302, performed after action 300 but before action 306.

It is to be noted that for both the above described embodiments, also various management parameters may be taken into account when deciding or selecting whether or not to adjust the RAN capabilities. For instance, in an intermediate action 304, performed after action 300 but before action 306, the RNC obtains a RAN report from the RBS, or gets an operator policy set. This alternative embodiment differs further in that the RNC takes the RAN reports and/or the operator policy in account when deciding or selecting in action 306.

Figure 4A:
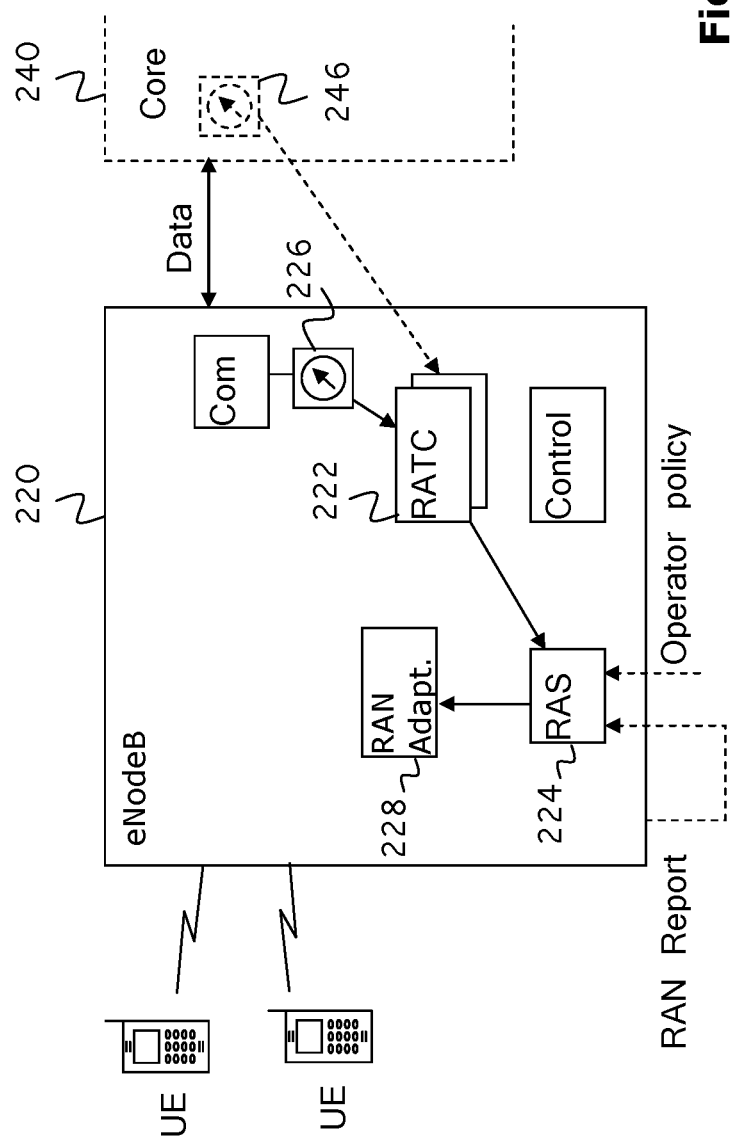
FIGS. 4a-b are schematic illustrations of arrangements, according to possible embodiments.
Figure 4B:
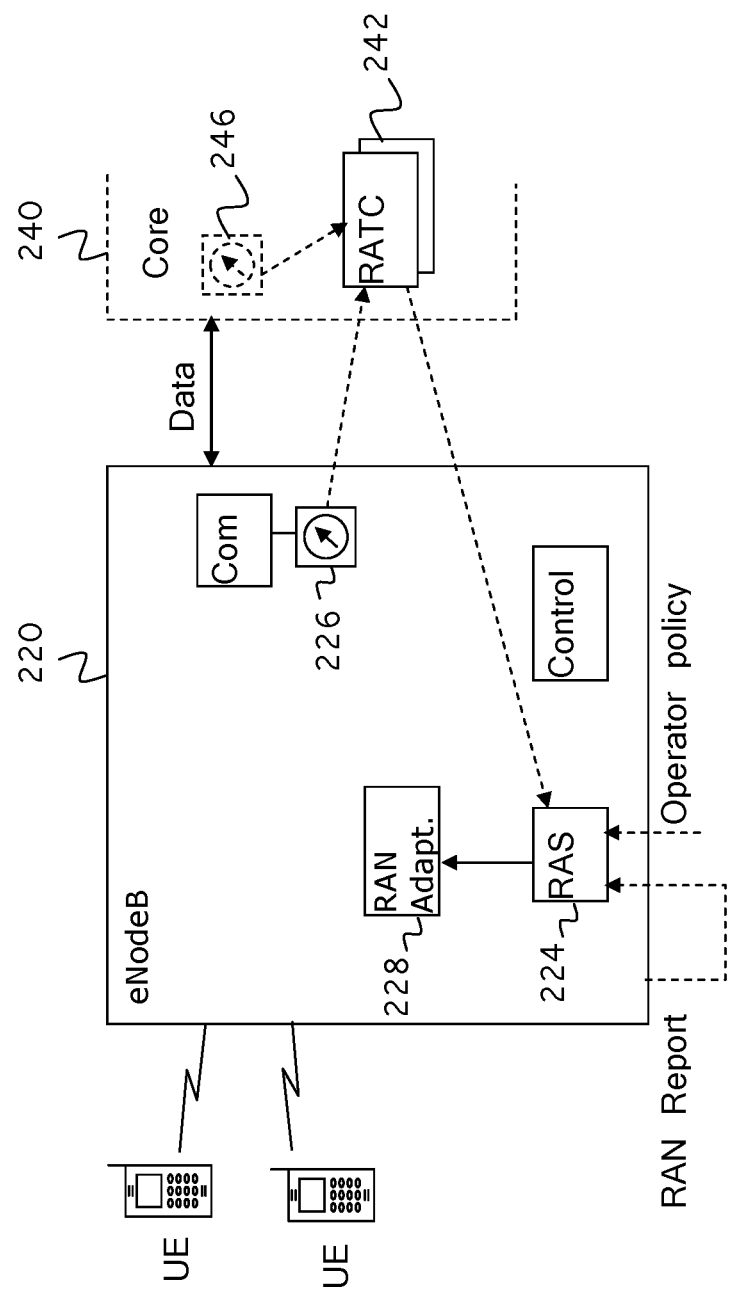

With reference to FIGS. 4a-b, which are schematic block diagrams, two communication network nodes 200 will now be described in accordance with further exemplifying embodiments.

These embodiments are two alternative embodiments which are related to the embodiment described in accordance with FIG. 2. Therefore, and in order to simplify the understanding of the disclosed concept, the same reference numbers will be used where appropriate. The communication network nodes 220 are implemented as eNodeBs, 220, i.e. RBSs of LTE (Long Term Evolution) communication networks. In the figures it is illustrated that the eNodeBs 220 serve UEs (User Equipments), which are associated to the eNodeBs via RANs. Typically, the eNodeBs 220 also comprise conventional functionality to operate properly, which is illustrated with a control unit and a communication interface, respectively. However, in order to simplify the understanding such conventional functionality has been omitted in this description.

Analogously, with the RNC 200 and the RBS 220 (FIG. 2), the eNodeBs 220 comprises a RAS 224 (204 in FIG. 2), a reporting unit 226 (206, 226 in FIG. 2), and a RAN Adaptation unit 228 (228 in FIG. 2). Furthermore, the eNodeB 220 which is illustrated in FIG. 4a comprises an RATC 222 (202a, 202b in FIG. 2). The eNodeB 220 which is illustrated in FIG. 4b lacks RATC, but is adapted to apply RATC functionality 242 of another communication network node, e.g. a core network node 240.

Regarding FIG. 4a, the RATC 222 is arranged to obtain measurement results of variations of backhaul characteristics from reporting units 226, 246, and compile into a backhaul characteristics value. The RAS 224 is arranged to decide or select whether or not the RAN capability of the eNodeB 220 will be adjusted, in response to the backhaul characteristics value. The RAS 224 is arranged to request the RAN Adaptation unit 228 to adjust the RAN capabilities of the eNodeB 220.

Regarding FIG. 4b, the RAS 224 is arranged to receive a backhaul characteristics value from an RATC 242 which is arranged in the core network node 240, where the backhaul characteristics value has been compiled of measurement results of variations of backhaul characteristics. The measurement results originates from reporting units 226, 246 arranged in various communication network nodes, e.g. the eNodeB 220 and the core network node 240, respectively.

It is to be noted that the communication network nodes of the described exemplifying embodiments are described in a non-limiting manner. However, a designer may select to implement further communication network nodes between the described communication network nodes within the described concept, such that the measurement results and backhaul characteristics values are obtained via these further communication network nodes. Moreover, the figures and embodiments illustrate a plurality of functional units in a non-limiting manner. However, a physical implementation of the proposed communication network nodes may be performed alternatively within the disclosed concept. For instance, functionality of a specific illustrated unit may be implemented in another suitable unit when put into practice.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a first communication network node-for enabling a radio base station to adjust a Radio Access Network, RAN, capability within a RAN dependent on one or more data transport characteristics of a backhaul network, wherein the RAN and the backhaul network are parts of a telecommunication network, and the first communication network node is arranged in the telecommunication network to communicate data between the RAN and a core network node in the telecommunication network, said method comprising:
   obtaining, by the first communication network node, information related to the one or more data transport characteristics of the backhaul network, wherein the data transport characteristics comprise at least one of data transfer rate, network delay, and network bandwidth,
   deciding by the first communication network node that the RAN capability will be adjusted, depending on the obtained information, and
   responsive to deciding that the RAN capability will be adjusted, generating a request to adjust the RAN capability by adjusting scheduling for a number of user equipments by a Radio Base Station serving the RAN.

2. The method according to claim 1, wherein the first communication network node is implemented as a Radio Network Controller (RNC),
   wherein the information relates to at least one of:
      End-to-End measurements between the Radio Base Station and the core network node, and
      link characteristics reports for communication links in the backhaul network,
   wherein the RNC obtains the information from one or more reporting units and compiles the information into a compiled backhaul characteristics value, and
   wherein the compiled backhaul characteristics value is used as a basis when deciding that at the RAN capability will be adjusted.

3. The method according to claim 1, wherein the first communication network node is implemented as a Radio Network Controller and obtains the information as a compiled backhaul characteristics value from a core network node or a radio base station, the backhaul characteristics value being compiled from at least one of:
   End-to-End measurements between the Radio Base Station and the core network node, and
   link characteristics reports for communication links of the backhaul network, and
   wherein the compiled backhaul characteristics value is used as a basis when deciding that the RAN capability will be adjusted.

4. The method according to claim 1, further comprising obtaining at least one of operator policies and RAN reports, wherein the obtained at least one of operator policies and RAN reports is used as a further basis when deciding that the RAN capability will be adjusted.

5. The method according to claim 1, wherein the first communication network node is implemented as the Radio Base Station, and the information relates to at least one of:
   end-to-end measurements between the Radio Base Station and the core network node, and
   link characteristics reports for communication links in the backhaul network,
   wherein the first communication network node compiles the information into a compiled backhaul characteristics value, and
   wherein the compiled backhaul characteristics value is used as a basis when deciding that the RAN capability will be adjusted.

6. The method according to claim 1, wherein the first communication network node is implemented as the Radio Base Station, and the information is obtained from the core network node as a compiled backhaul characteristics value representing the one or more data transport characteristics of the backhaul network, and
   wherein the compiled backhaul characteristics value is used as a basis when deciding that the RAN capability will be adjusted.

7. The method according to claim 1, wherein the obtained information relates to a further one or more data transport characteristics of the backhaul network, and
   wherein the first communication network node decides that a further RAN capability will be adjusted and generates a request to adjust the further RAN capability.

8. A first communication network node for enabling a radio base station to adjust a Radio Access Network, RAN, capability within a RAN dependent on one or more data transport characteristics of a backhaul network, wherein the RAN and the backhaul network are parts of a telecommunication network, and the first communication network node is arranged in the telecommunication network to communicate data between the RAN and a core network node in the telecommunication network, said first communication network node comprising:
   a RAN Adaptation selection circuit adapted to obtain information related to variations of the one or more data transport characteristics of the backhaul network, the data transport characteristics comprising at least one of: data transfer rate, network delay, and network bandwidth, the RAN Adaption selection circuit being further adapted to:
      decide that the RAN capability will be adjusted, depending on the obtained information, and,
      responsive to deciding that the RAN capabilities will be adjusted, request a RAN Adaptation circuit to adjust the RAN capability by adjusting scheduling for a number of user equipments, the RAN Adaptation circuit being comprised in a Radio Base Station serving the RAN.

9. The first communication network node according to claim 8, being implemented as a Radio Network Controller comprising at least one RAN Aggregation Transport Characteristics circuit,
wherein the information relates to at least one of:
End-to-End measurements between the Radio Base Station and the core network node, and
link characteristics reports for communication links of the backhaul network,
wherein the RAN Aggregation Transport Characteristics circuit is adapted to obtain the information from one or more reporting circuits and compile the information into a compiled backhaul characteristics value, and
wherein the RAN Adaption Selection circuit is adapted to use the compiled backhaul characteristics value as a basis when deciding that the RAN capability will be adjusted.

10. The first communication network node according to claim 8, being implemented as a Radio Network Controller and adapted to obtain the information as a compiled backhaul characteristics value from a core network node or a radio base station, the backhaul characteristics value being compiled from at least one of:
End-to-End measurements between the Radio Base Station and the core network node, and
link characteristics reports for communication links in the backhaul network,
wherein the RAN Adaption Selection circuit is adapted to use the compiled backhaul characteristics value as a basis when deciding that the RAN capability will be adjusted.

11. The first communication network node according to claim 8, wherein the RAN Adaption Selection circuit is further adapted to obtain at least one of operator policies and RAN reports and to use the obtained at least one of operator policies and RAN reports as a further basis when deciding that the RAN capability will be adjusted.

12. The first communication network node according to claim 8, being implemented as the Radio Base Station, and comprising at least one RAN Aggregation Transport Characteristics circuit,
wherein the information relates to at least one of:
End-to- End measurements between the Radio Base Station and the core network node, and
link characteristics reports for communication links of the backhaul network,
wherein the RAN Aggregation Transport Characteristics circuit is adapted to obtain the information from one or more reporting circuits and compile the information into a compiled backhaul characteristics value, and the RAN Adaption Selection circuit is adapted to use the compiled transport characteristics value as a basis when deciding that the RAN capability will be adjusted.

13. The first communication network node according to claim 8, being implemented as the Radio Base Station,
wherein RAN Adaptation Selection circuit is adapted to obtain the information as a compiled backhaul characteristics value representing the one or more data transport characteristics of the backhaul network, and the RAN Adaptation Selection circuit is further adapted to use the compiled backhaul characteristics value as a basis when deciding that the RAN capability will be adjusted.

14. The first communication network node according to claim 12, wherein the Radio Base Station further comprises the RAN Adaptation circuit, and the RAN Adaptation circuit is adapted to adjust the RAN capability.

15. A method performed by a first communication network node-for enabling a radio base station to adjust a Radio Access Network, RAN, capability within a RAN dependent on one or more data transport characteristics of a backhaul network, wherein the RAN and the backhaul network are parts of a telecommunication network, and the first communication network node is arranged in the telecommunication network to communicate data between the RAN and a core network node in the telecommunication network, said method comprising:
obtaining, by the first communication network node, information related to the one or more data transport characteristics of the backhaul network, wherein the data transport characteristics comprise at least one of data transfer rate, network delay, and network bandwidth,
deciding by the first communication network node that the RAN capability will be adjusted, depending on the obtained information, and
responsive to deciding that the RAN capability will be adjusted, generating a request to adjust the RAN capability by the radio base station performing a handover of a number of user equipments to another radio base station.

16. A first communication network node for enabling a radio base station to adjust a Radio Access Network, RAN, capability within a RAN dependent on one or more data transport characteristics of a backhaul network, wherein the RAN and the backhaul network are parts of a telecommunication network, and the first communication network node is arranged in the telecommunication network to communicate data between the RAN and a core network node in the telecommunication network, said first communication network node comprising:
a RAN Adaptation selection circuit adapted to obtain information related to variations of the one or more data transport characteristics of the backhaul network, the data transport characteristics comprising at least one of: data transfer rate, network delay, and network bandwidth, the RAN Adaption selection circuit being further adapted to:
decide that the RAN capability will be adjusted, depending on the obtained information, and,
responsive to deciding that the RAN capabilities will be adjusted, request the RAN Adaptation circuit to adjust the RAN capability by performing a handover of a number of user equipments to another radio base station.

* * * * *